(12) United States Patent
Delacroix

(10) Patent No.: US 11,167,604 B2
(45) Date of Patent: Nov. 9, 2021

(54) METHOD AND SYSTEM FOR ESTIMATING THE SEVERITY OF TIRE USAGE CONDITIONS

(71) Applicant: COMPAGNIE GENERALE DES ETABLISSEMENTS MICHELIN, Clermont-Ferrand (FR)

(72) Inventor: Serge Delacroix, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 80 days.

(21) Appl. No.: 16/469,862

(22) PCT Filed: Dec. 8, 2017

(86) PCT No.: PCT/FR2017/053472
§ 371 (c)(1),
(2) Date: Jun. 14, 2019

(87) PCT Pub. No.: WO2018/109336
PCT Pub. Date: Jun. 21, 2018

(65) Prior Publication Data
US 2019/0315165 A1 Oct. 17, 2019

(30) Foreign Application Priority Data

Dec. 15, 2016 (FR) ...................................... 1662533

(51) Int. Cl.
*B60C 23/20* (2006.01)
*G01N 23/18* (2018.01)

(52) U.S. Cl.
CPC ........... *B60C 23/20* (2013.01); *G01N 23/185* (2013.01)

(58) Field of Classification Search
None
See application file for complete search history.

(56) References Cited

U.S. PATENT DOCUMENTS 6,921,197 B2 * 7/2005 Aubel ................. B60C 23/0493
374/120
7,316,251 B2 * 1/2008 Kogure .................. B60C 23/20
152/152.1

(Continued)

FOREIGN PATENT DOCUMENTS

| CN | 105492224 A | 4/2016 |
|---|---|---|
| WO | 2008/046766 A1 | 4/2008 |

OTHER PUBLICATIONS

International Search Report dated Feb. 19, 2018, in corresponding PCT/FR2017/053472 (4 pages).

*Primary Examiner* — Andre J Allen
*Assistant Examiner* — Jermaine L Jenkins
(74) *Attorney, Agent, or Firm* — Venable LLP

(57) ABSTRACT

A method for estimating the severity of conditions of use of a tire installed on a vehicle comprises the following steps: a step of measuring the speed of the vehicle and the load of the vehicle, a step of evaluating, as a function of the measurements performed, the power of the internal heat dissipations of the tyres, and a step of determining, as a function of this power, the internal temperature of the tyre, a step of recording the number of wheel revolutions performed and/or the time spent in conditions of use corresponding to a given temperature interval. There is also a system that makes it possible to implement said method.

9 Claims, 2 Drawing Sheets

(56) References Cited

U.S. PATENT DOCUMENTS

| | | | |
|---|---|---|---|
| 7,568,384 B2* | 8/2009 | Morinaga | B60T 8/1725 |
| | | | 73/146 |
| 9,434,409 B2* | 9/2016 | Singh | B60C 23/20 |
| 10,245,905 B2 | 4/2019 | Sudou | |
| 2010/0132445 A1 | 6/2010 | Tozawa et al. | |
| 2010/0319446 A1 | 12/2010 | Coue | |
| 2016/0229234 A1 | 8/2016 | Sudou | |
| 2016/0375733 A1* | 12/2016 | Lesesky | B60C 23/0494 |
| | | | 340/442 |

* cited by examiner

METHOD AND SYSTEM FOR ESTIMATING THE SEVERITY OF TIRE USAGE CONDITIONS

FIELD OF THE INVENTION

The present invention relates to the conditions of use of road vehicle tyres, in particular the tyres of towed road transport vehicles. It relates in particular to a method and a system for evaluating the severity of these conditions of use.

It has been observed that, when a semi-trailer is rolling, the internal heat dissipations of the tyres caused a heating effect. Now, a high internal temperature maintained for a prolonged period of time provokes a degradation of the materials forming the tyre, in particular the rubbers and the reinforcers.

The abovementioned vehicles are generally provided with a braking computer, also called TEBS (Trailer Electronic Braking System) which makes it possible to provide various functions such as attitude regulation, load measurement, modulation of braking controls, or even the anti-lock braking function.

The vehicle can also be provided with a telematics system which aggregates and transmits geographic, load and speed information.

However, as yet, these computers supply no information regarding the conditions of use of a tyre that can lead to a heating effect and therefore to a premature ageing of the tyres. Now, knowing these conditions of use could be useful to a transporter or fleet manager to allow him or her to optimize his or her mount, or to a service provider for optimizing service offerings intended for transporters or tyre fleet managers.

The application WO 2008046766 A1 discloses a method for indicating the ageing undergone by the tyre, in which a temperature is measured locally at least at one point of the tyre. However, this method requires the installation of a temperature sensor directly in the tyre, which proves intrusive for manufacturing of the tyre, and which generates additional costs.

It is possible in theory to recompute the thermal history a posteriori if all the history over time (loads, speeds) has been recorded. However, this requires a large quantity of data to be stored or transmitted, because the temporal order is important.

The present invention thus aims to provide a method and a system for evaluating the severity of conditions of use of a tyre while remedying the abovementioned drawbacks.

BRIEF DESCRIPTION OF THE INVENTION

Thus, the invention relates to a method for estimating the severity of conditions of use of a tyre installed on a vehicle, the method comprising the following steps:
- a step of measuring the speed of the vehicle and the load of the vehicle,
- a step of evaluating, as a function of the measurements performed, the power of the internal heat dissipations of the tyres, and
- a step of determining, as a function of this power, the internal temperature of the tyre,
- a step of recording the number of wheel revolutions performed and/or the time spent and of updating the count of cycles and times by temperature class.

The term "internal temperature" of the tyre should be understood to mean the temperature within a material forming the architecture of the tyre.

The invention described consists in calculating an estimation of the temperature of the tyre in the embedded computer in real time, by updating a thermal model according to the measurements transmitted by the sensors to the computer and aggregating a compact and synthetic descriptor of thermal severity, instead of transmitting a stream of data.

This method is advantageously implemented by an estimation system according to the invention, comprising an embedded computer and data recording means. The braking computer comprises various functionalities, that make it possible to
- measure the speed of the vehicle and the load of the vehicle,
- evaluate, as a function of the measurements performed, the power of the internal heat dissipations of the tyres, and
- determine, as a function of this power, the internal temperature of the tyre.

The embedded computer implemented in the present invention can be a braking computer, or a computer incorporated in a telematics unit installed in the vehicle, or any other computer specific to the vehicle. In effect, it is sufficient for the computer to be able to receive data concerning the load and the speed of the vehicle, data available over the data bus of the vehicle after measurement by embedded sensors.

In effect, the braking computers conventionally installed on semi-trailers comprise means for determining the load and the instantaneous speed of each axle. Starting from this information, it becomes possible to evaluate the heat sources internal to the tyre, as well as the coefficients of thermal convection with the ambient air.

In a method according to the invention, it is then possible to use, to evaluate the internal temperature of the tyre, a digital thermal model of the tyre, resolved in real time according to the load and speed measurements and the available temperatures. Advantageously, a generic model is used, that corresponds to a tyre conventionally used, to a position on the vehicle, front or rear, and to the vehicle considered. In effect, the present invention does not aim to provide a remaining service life for a real tyre, but information on the severity of the conditions of use.

It has thus been found that this information could be obtained from a generic model, without it being necessary to adapt it to each specific tyre, or for it to be necessary to update the parameters of the model as the wear of the tyre progresses.

This digital model, whose resolution will be detailed later, is implemented for example by a computer embedded in the vehicle. Now, it is useful to be able to limit the computation power implemented, so as not to prevent the computer from performing the other operations for which it is used. To this end, it is possible to reduce the equations and the degrees of freedom of the thermal model to the directions where the strongest thermal gradients occur. Thus, the circumferential gradient is substantially nil and the meridian gradient is low in the area of interest. The gradient normal to the surface of the tyre is predominant in the heat flows. Thus, the computation of the temperatures is reduced to a profile in the thickness and can be envisaged without great resources in terms of computation time.

Likewise, the temperature updating time interval is fairly long so as not to consume too much computation power and fairly short to capture vehicle speed transients, for example from 0.1 s to 10 s.

The system further comprises means for recording the number of wheel revolutions performed in conditions of use corresponding to a given temperature interval. In effect, it has been found that the mechanical fatigue of a tyre is linked to the number of mechanical cycles, to their amplitude and to the temperature at which they take place. In general, the temperature rise negatively affects the strength of the materials. That is why it is proposed here to estimate the severity of use by counting the cycles (wheel revolutions) per temperature class, or the time spent per temperature class. Some chemical degradation processes also involve the time spent at high temperature. That is why the times spent per temperature class are also counted.

In a particular embodiment, the method further comprises a step of measuring the ambient temperature. In an exemplary embodiment, this step is implemented by an ambient temperature sensor, for example installed in the braking computer. Advantageously, this ambient temperature is taken into account for the evaluation of the power of the thermal dissipations or for any other computation of thermal equilibrium.

In another embodiment, that can be combined with the preceding one, the method comprises a step of measuring the internal temperature. This measurement is for example performed, in a system according to the invention, by a device of thermometric TPMS (Tyre Pressure Monitoring System) type.

In an advantageous embodiment, a method according to the invention comprises a step of measuring the temperature of the rim on which the tyre is installed. Advantageously, this step is implemented by a temperature sensor for sensing the temperature of the rim on which the tyre is installed.

In an advantageous embodiment, a method according to the invention comprises a step of resetting the records to zero performed when the installation of a new tyre is detected.

As previously indicated, the invention aims to provide not only a means of evaluating the severity of the conditions of use, but also to transform this information into data that can be analysed for a user.

Thus, a system according to the invention comprises, in an advantageous embodiment, means for constructing, as a function of the recorded information, a histogram of time and of number of cycles per temperature class, and means for displaying this histogram in a diagnostic tool.

It is also possible, as a function of the recorded information, to propose several applications made available to a fleet manager, for example a tyre ageing alert, allowing the manager to know that it is time to change the tyres of a vehicle. It is also possible to envisage an alert intended for a driver, when the recorded information show an unusual severity of use of the tyres, and to do so independently of the state of wear of the tyres.

In another embodiment, an arrhenian kinetic or related approach is used to estimate the consumption of protective substances present in the rubbers of a tyre and/or the ageing of the materials of which the tyre is composed, and therefore the degradation of the tyres.

In another example, the braking computer transmits the recorded information to a telematics system of the vehicle or a mobile terminal, the transmission being performed via a CAN bus or by radiofrequency.

In another example, the computation described is performed by a computer having access to the flow of load and speed data and, if appropriate, of temperature data via the CAN bus, that possibly being the case with a telematics computer.

BRIEF DESCRIPTION OF THE FIGURES

Other objectives and advantages of the invention will emerge clearly from the following description of the preferred but nonlimiting embodiment, illustrated by the following figures in which.

DESCRIPTION OF THE BEST EMBODIMENT OF THE INVENTION

Figure 1:
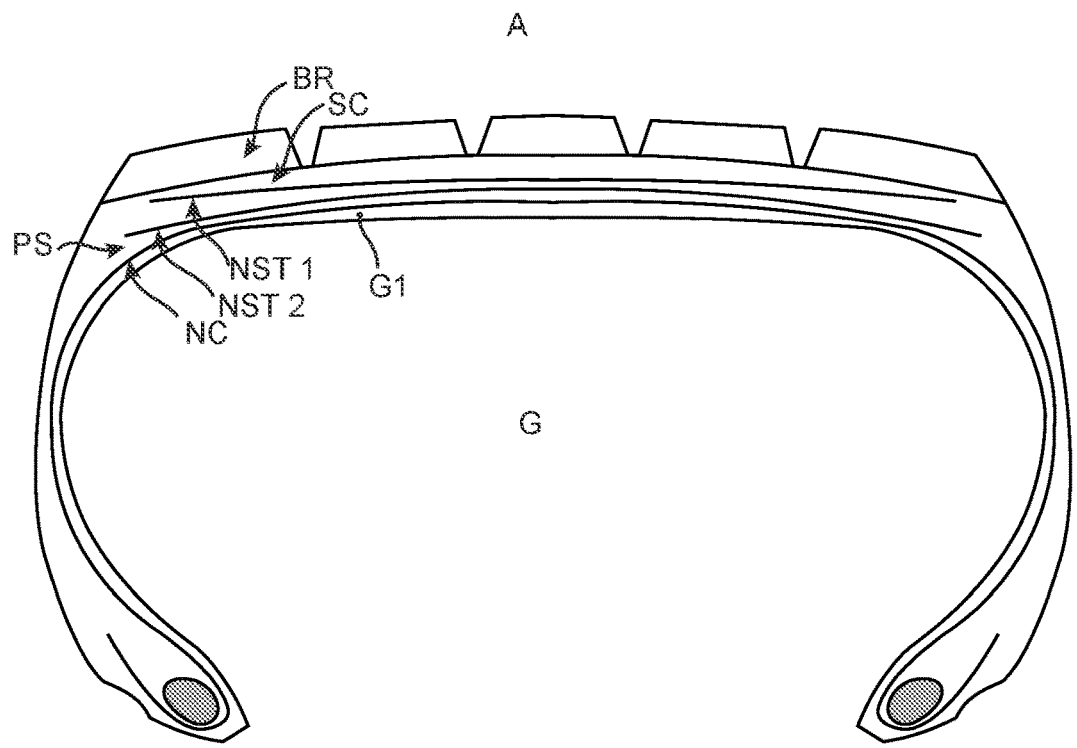
FIG. 1 shows a tyre section.
Figure 2:
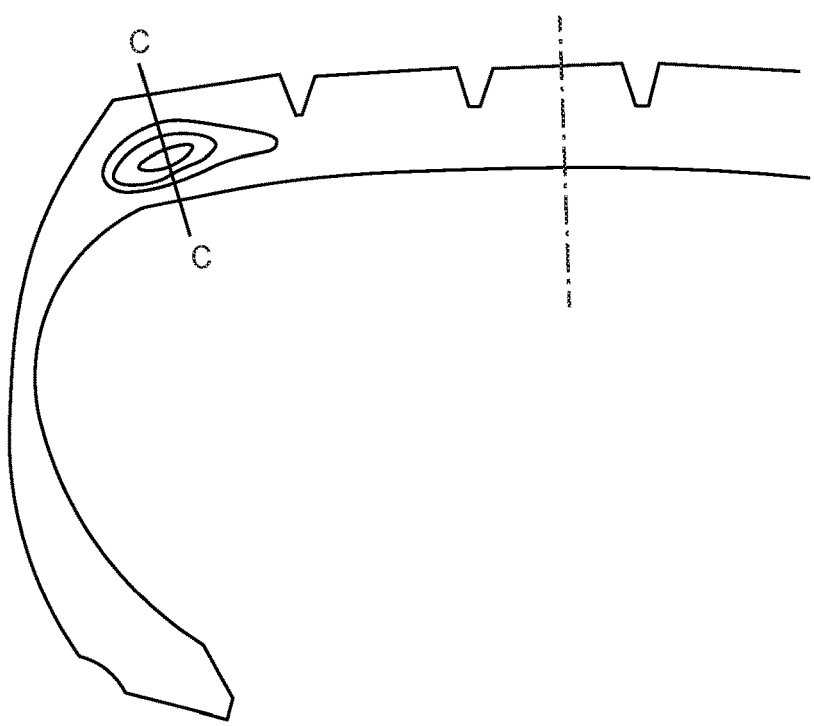
FIG. 2 shows an example of isotherm curves in a tyre.
Figure 3:
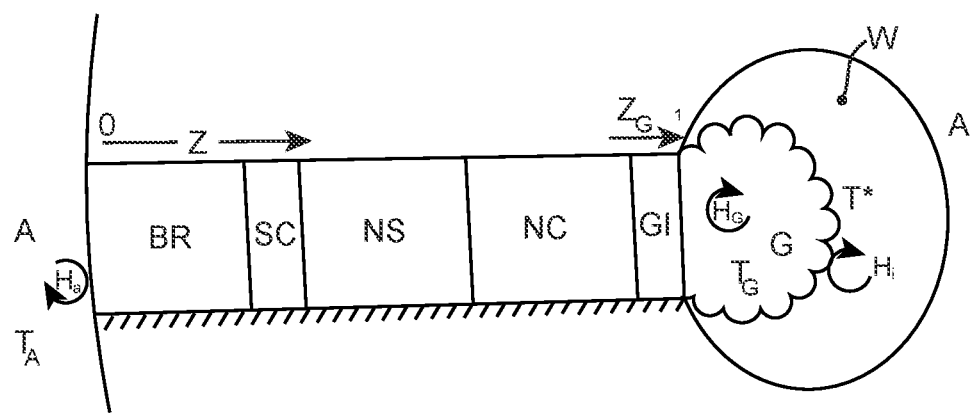
FIG. 3 shows a diagram of the heat exchanges within a tyre.

FIG. 1 shows a meridian section of a heavy truck tyre and the simplified architecture of its components. FIG. 2 shows the embedding of the isotherms around a temperature extremum situated at the shoulder. The cross section CC passes through the extremum zone. Along this line, the temperature gradients in the circumferential and meridian directions are very weak and the heat fluxes are substantially collinear to the line C-C. FIG. 3 schematically shows the heat exchanges within a tyre similar to that of FIG. 1. The references used in FIGS. 1 and 3 therefore represent the same elements.

The simplified thermal operation of this zone is represented, reduced to one dimension such as a stacking of layers of materials each characterized (a) by their thermal properties (conductivity, volume heat capacity) and (b) by an estimator of the volume sources of dissipation as a function of the load, speed, local current temperature and the braking of the tyre. This function is established by real measurement or based on comprehensive digital simulations.

Typically, the thermal conductivity of the rubber mixture has the value 0.25 to 0.30 W/(K·m), its density is close to 1100 kg/m$^3$, its mass heat capacity is of the order of 1470 J/Kg/K.

It is possible to express this function as the product of a single function P(z,v) dependent on the load z of the tyre and its speed v, of a factor Q dependent on the local temperature and of a constant coefficient $K_i$ per material: $P_i(z,v,T)=K_i \cdot P(z,v,) \cdot Q(T)$ Typically, the source P for a tyre rolling at 10 m/s (36 km/h) at 60° C. has the value 2.5 E+4 W/m3 in the tread, i.e. a dissipation of 7500 J/m3 per cycle. This source decreases with temperature, and increases with load and speed.

FIG. 1 represents an example of a tyre that is not limiting in that the invention can be applied to tyres having different architectures in terms of number and nature of the components.

Thus, the outermost layer of the tyre is the tread BR, which is directly in contact with the ambient air A around the vehicle on which a system according to the invention is installed. It is specified here that, in the context of the invention, the temperature of this ambient air is for example measured by a sensor installed on the vehicle, and can be taken into account in the determination of the internal temperature of the tyre.

The tread is generally attached to a sublayer SC, ensuring the bond with the crown plies. The sublayer generally has a different composition from the tread. This sublayer is installed on crown plies NS, which comprise, for example, fabric or metallic reinforcing elements. These crown plies NS are terminated by crown feet PS, positioned above the casing plies, which rest on the inner lining GI of the internal gas volume G, which are in direct contact with the internal gas G. Thus, a temperature gradient is created within the architecture of the tyre, from the block BR to the internal gas.

The internal gas, also called inflation gas, is trapped between the tyre and the wheel. Heat exchanges therefore take place between this gas G and the wheel R, which is itself subjected to exchanges with the ambient air A.

There now follows a description of the implementation of a method according to the invention by a braking computer, in a tyre having an architecture similar to that of FIG. 1.

The resolving principle is as follows: On each finite time interval dt, for example 1 s, the braking computer updates the average load per tyre and the speed per tyre. It computes the heat sources per material zone, and the exchange coefficients at the walls. The ambient temperature is possibly available as previously indicated.

The equation of discretised transient heat is integrated for the duration of dt, which provides an estimation of the temperature in the standard section:

$$\frac{\partial T}{\partial t} = \frac{\lambda}{\rho C} \frac{\partial^2 T}{\partial z^2} + \frac{P}{\rho C}$$

The unknowns are the temperatures T(z,t) at the time t and at the depth z, counted from the outer surface of the section (z=0) and the temperature of the inflation gas $T_G(t)$ at the time t.

The conditions at the flow limits on the ambient air side are $\Phi a = H_a(T(0, t) - T_a)$. The exchange coefficient $H_a$ at the outer wall in line with the section CC depends on the speed v of the vehicle and on $T_a$. It is typically 50 W/m²/K at 80 km/h. And on the internal gas side $\Phi_G = H_G(T(z_G, t) - T_G)$.

The temperature $T_G$ of the internal gas originates from a TPMS sensor if available, otherwise it is estimated by the method described hereinbelow.

The initial temperatures are established at ambient temperature or at a default value.

The internal gas G of mass $m_G$ is considered at constant temperature $T_G$. It exchanges heat with all of the walls delimiting the internal volume $$m_G C_V \frac{\partial T_G}{\partial t} = S_G H_i(T^* - T_G)$$

in which $H_i$ is the exchange coefficient between the internal wall and the internal gas, $C_v$ is the heat capacity of the volume, $S_G$ is the section, and T* is the effective temperature of the inner wall, defined as a weighted average of the ambient temperature $T_A$ and of the temperature $T(z_G)$ of the internal wall of the section CC.

$$T^* = [\beta T(z_G) + (1-\beta) T_A]$$

Typically β=0.12.

The section CC is discretised in slices delimited by nodes according to the conventional finite elements methods.

The equation can then be resolved by using an explicit Euler resolution scheme as follows by retaining a fairly small dt for the scheme to be stable ($\Delta t \ll (\Delta z/\alpha)^{0.5}$, in which $\Delta z$ is the smallest interval and α is the corresponding diffusivity):

$$T_i^{k+1} = T_i^k + \frac{\Delta t}{\Delta x^2} \frac{\lambda_i^k}{\rho C_p} [T_{i+1}^k + T_{i-1}^k - 2T_i^k] + \frac{\Delta t P_i^k}{\rho C_p}$$

Advantageously, if the embedded computer has enough memory and power, other known schemes ensure an improved stability for great intervals dt (Crank-Nicolson, Adams-Moulton, Gear, Newmark).

In the case where the thickness intervals are unequal, the laplacien ΔT is estimated according to the finite elements method with functions of appropriate form, for example "cap" functions.

Figure 4:
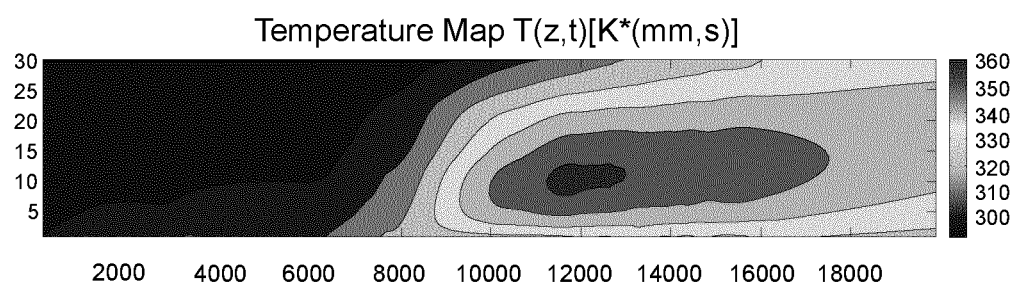
FIG. 4 shows the trend of the internal temperature of a tyre during a rolling sequence.
Figure 4:
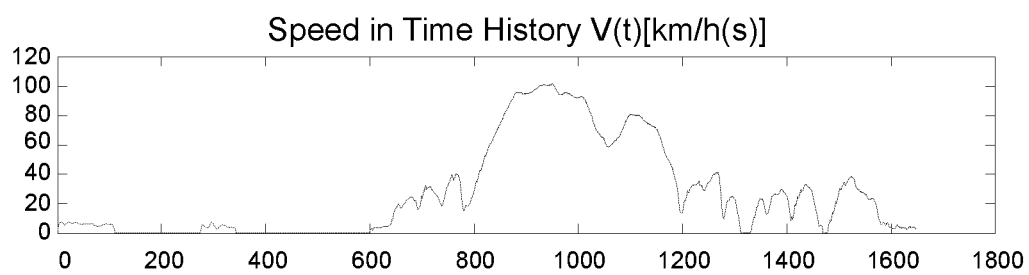

It is then possible to establish a temperature map over a rolling sequence, as shown in FIG. 4. The bottom curve shows the speed of the vehicle over a studied rolling sequence. The top map shows the internal temperature of the tyre over this same rolling sequence. The abscissa common to the two curves shows the time. The temperature of the tyre is expressed according to the depth, this depth being computed relative to the surface of the tread.

In this example, it is observed on this curve that, after 1650 s, the speed of the vehicle is zero, and the tyre cools. The hot point of the tyre is situated approximately at 11 mm in the depth, which means that it is the material situated at this point which will be the most subject to ageing over this sequence.

On each interval dt, the temperature profile found is used to update two histograms: (a) the time spent in a temperature class and (b) the number of wheel revolution cycles in a temperature class.

The histogram (b) is used by performing a weighting:

$$Y = \sum_i \frac{n_i}{N_i}$$

in which the $n_i$ are the sizes of the classes and $N_i$ are characteristic constants of the temperature class $T_i$. A score $$S_1 = \frac{\sum_i n_i}{Y}$$

is determined.

The histogram (a) is used according to an Arrhenius law. Conventionally, the rate of ageing $$w = A \exp\left(\frac{-E}{RT}\right)$$

in which T is the temperature expressed in °K, E is an activation energy typically between 40 and 80 kJ/mol, R is the constant of the ideal gases and A is a constant. The score $$S_2 = \frac{\int w \cdot dt}{\int dt}.$$

The system can also provide a score $S_3$ linked to the energy efficiency of the tyre, because the rolling resistance of a tyre is lower when it is fairly hot. This score is constructed with the histogram (b) by weighting the dissipations $d_i$ by cycles that are a function of the temperature $T_i$ of the class i according to their frequency of occurrence: $S_3 = \Sigma_i d_i n_i / \Sigma_i n_i$. This score is particularly useful for characterizing a use in predominantly transient state.

The embedded computer keeps the histograms up to date. The computation of the scores can take place remotely, in diagnostic software or a diagnostic server.

Advantageously, the tyre model to the embedded or remote system to apply specific parameters instead of generic parameters.

The invention claimed is:

1. A method for estimating the severity of conditions of use of a tire installed on a vehicle, the method comprising the following steps:
    measuring a speed of the vehicle and a load of the vehicle;
    evaluating, as a function of the measurements performed, a power of internal heat dissipations of the tire;
    determining, as a function of the power, an internal temperature of the tire; and
    recording at least one of a number of wheel revolutions performed and a time spent in conditions of use corresponding to a given temperature interval.

2. The method according to claim 1 further comprising a step of measuring ambient temperature, wherein ambient temperature is taken into account in the evaluation of thermal power.

3. The method according to claim 1 further comprising a step of measuring a temperature of a rim on which the tire is installed.

4. The method according to claim 1 further comprising a step of resetting records to zero performed when the installation of a new tire is detected.

5. The method according to claim 1 further comprising a step of determining, as a function of recordings made, a need for maintenance or inspection of the tire.

6. A system for estimating the severity of conditions of use of a tire installed on a road vehicle, the system comprising a braking computer comprising:
    means for measuring a speed of the vehicle and a load of the vehicle;
    means for evaluating, as a function of the measurements performed, a power of the internal heat dissipations of the tire;
    means for determining, as a function of the power, an internal temperature of the tire; and
    means for recording at least one of a number of wheel revolutions performed and a time spent in conditions of use corresponding to a given temperature interval.

7. The system according to claim 6 further comprising an ambient temperature sensor installed in the braking computer.

8. The system according to claim 6 further comprising a temperature sensor for sensing a temperature of a rim on which the tire is installed.

9. The system according to claim 6 further comprising means for alerting a driver or a user of the vehicle of a need for maintenance or inspection of the tire.

* * * * *